US008509113B2

(12) United States Patent
Connolly et al.

(10) Patent No.: US 8,509,113 B2
(45) Date of Patent: Aug. 13, 2013

(54) METHODS AND SYSTEMS FOR MANAGING DIGITAL CROSS-CONNECT MATRICES USING VIRTUAL CONNECTION POINTS

(75) Inventors: Matthew Connolly, Canton, GA (US); Jon Carroll, Alpharetta, GA (US); Satish Gopalakrishna, Alpharetta, GA (US); Richard Conklin, Gainesville, GA (US)

(73) Assignee: Ciena Corporation, Hanover, MD (US)

( * ) Notice: Subject to any disclaimer, the term of this patent is extended or adjusted under 35 U.S.C. 154(b) by 989 days.

(21) Appl. No.: 11/331,335

(22) Filed: Jan. 12, 2006

(65) Prior Publication Data
US 2007/0160068 A1    Jul. 12, 2007

(51) Int. Cl.
*H04L 12/28* (2006.01)
*H04L 12/56* (2006.01)

(52) U.S. Cl.
USPC .................. 370/254; 370/396; 370/410

(58) Field of Classification Search
USPC .......................................................... 370/386
See application file for complete search history.

(56) References Cited

U.S. PATENT DOCUMENTS

| | | | | |
|---|---|---|---|---|
| 4,845,736 A | * | 7/1989 | Posner et al. | 379/27.01 |
| 5,623,480 A | * | 4/1997 | Hartmann et al. | 370/241 |
| 5,631,902 A | * | 5/1997 | Yoshifuji | 370/388 |
| 5,812,528 A | * | 9/1998 | VanDervort | 370/235 |
| 6,665,295 B1 | * | 12/2003 | Burns et al. | 370/389 |
| 6,982,989 B2 | * | 1/2006 | Park et al. | 370/471 |
| 7,016,379 B2 | * | 3/2006 | Falkenstein et al. | 370/535 |
| 7,263,290 B2 | * | 8/2007 | Fortin et al. | 398/58 |
| 7,330,425 B1 | * | 2/2008 | Gulati et al. | 370/225 |
| 2002/0093952 A1 | * | 7/2002 | Gonda | 370/369 |
| 2003/0011846 A1 | * | 1/2003 | Gholamhosseini et al. | 359/135 |
| 2005/0105538 A1 | * | 5/2005 | Perera et al. | 370/396 |
| 2005/0195807 A1 | * | 9/2005 | Rao et al. | 370/386 |

OTHER PUBLICATIONS

Cellsoft, "TMN Information Models—M.3100, G.803", http://www.cellsoft.de/telecom/tmninformationmodels.htm, Dec. 13, 2004.*

* cited by examiner

*Primary Examiner* — Faruk Hamza
*Assistant Examiner* — Cassandra Decker
(74) *Attorney, Agent, or Firm* — Clements Bernard PLLC; Christopher L. Bernard; Lawrence A. Baratta, Jr.

(57) ABSTRACT

The present invention provides methods and systems for managing matrices of connections within digital switching fabrics. The methods and systems include means for defining one or more of sources and sinks in a matrix of connections as one or more of unidirectional connection termination points and novel unidirectional virtual connection points, where each of the unidirectional virtual connection points is a logical object that is maintained in software that defines connections between one or more of network resources and logical objects. The virtual connection points selectively act as origination points for one or more of other virtual connection points and termination points in a cross-connect; termination points for one or more of other virtual connection points and origination points in a cross-connect; origination points for a multicast set of connections; intermediate points within a cross-connect for the addition of new connections; selectors for two or more inputs; simultaneously as selectors for two or more inputs and as origination points for a multicast set of connections; one or more of bridges, selectors, and bridge/selectors in a protection application; one or more of origination points and termination points in a signaled network connection; local test access points; and/or remote test access points.

23 Claims, 19 Drawing Sheets

FIG. 3. *(Prior Art)*

METHODS AND SYSTEMS FOR MANAGING DIGITAL CROSS-CONNECT MATRICES USING VIRTUAL CONNECTION POINTS

FIELD OF THE INVENTION

The present invention relates generally to the telecommunications and networking fields, among others. More specifically, the present invention relates to methods and systems for managing digital cross-connect matrices using virtual connection points (VCPs). The use of these virtual connection points enables efficient multicast, drop-and-continue, protection, signaled network connection, bridge-and-roll, test access point, and circuit switching applications, among others.

BACKGROUND OF THE INVENTION

The conventional model, well known to those of ordinary skill in the art, for managing cross-connects in a digital switching fabric is defined by the International Telecommunications Union (ITU) and Telecordia standards bodies. A cross-connect object is defined in the standards as a managed connection between two or more termination points (TPs), or connection termination points (CTPs). Digital cross-connects can be either unidirectional or bi-directional. Unidirectional cross-connects can be either point-to-point or point-to-multipoint (i.e. multicast). A specific example of the prior art is disclosed in the ITU M3100 network object model, which includes the following object definitions: ITU M3100 Termination Point—a physical or logical termination point on a switching device, defining the physical or logical point of origination and/or point of termination for a connection, where the termination point object can be either unidirectional or bi-directional, in the unidirectional case there existing both source termination points and sink termination points; ITU M3100 Cross-Connect—an object that defines the interconnection between two or more termination points; and ITU M3100 Multicast Cross-Connect—a cross-connect object that supports only unidirectional termination points, but which supports multiple terminating sink termination points.

The ITU M3100 cross-connect configuration is illustrated in FIG. 1, and, specifically, a point-to-point cross-connect between two termination points. The figure illustrates two termination points 10 linked via a cross-connect 12, a connectivity pointer 14, and two cross-connect object pointers in the termination points and two from/to termination pointers in the cross-connect objects 16.

The ITU M3100 multicast configuration is illustrated in FIG. 2. The figure illustrates a plurality of termination points 10 linked to a plurality of cross-connects 12 via a plurality of cross-connect object pointers in the termination points and from/to termination pointers in the cross-connect objects 16. The plurality of cross-connects 12 are linked to a multi-point cross-connect 18 and the plurality of termination points 10 are linked to an additional termination point 10 via a plurality of connectivity pointers 14. Finally, the multi-point cross-connect 18 is linked to the additional termination point 10 via a cross-connect object pointer in the termination point and from/to termination pointer in the cross-connect object 16.

The standards-based prior art, for example, requires that the input for a selector switch be a termination point. The input termination point of a cross-connect, however, can change based upon well-defined criteria, i.e. a failed signal or user-initiated switch. A roll operation (point-to-point unidirectional sink termination) with the ITU M3100 cross-connect configuration in bridge-and-roll is illustrated in FIG. 3. The figure illustrates a plurality of termination points 10 and a cross-connect 12 within the digital switching fabric 20. It should be noted that ITU M3100 Amendment 5 provides a method of converting bi-directional cross-connects to unidirectional point-to-point cross-connects, and converting unidirectional point-to-point cross-connects to multicast cross-connects. The Telecordia standards body provides a similar model for cross-connects in a switch fabric intended for digital communications.

Conventional bi-directional digital cross-connect designs relate a single bi-directional termination point to another single bi-directional termination point and allow for the management of the connection through software. Similarly, conventional unidirectional digital cross-connect designs relate a single unidirectional source termination point to one or more (in the multicast case) unidirectional sink termination points. Conventional cross-connect models inherently limit the scaling of the cross-connect matrix due to the fact that the cross-connect relationship is always defined between termination points. One limitation addressed by the methods and systems of the present invention is the case of drop-and-continue multicast connections, which must be protected (i.e. have redundant tributaries) within the network. Other applications addressed by the methods and systems of the present invention include signaled network connection, bridge-and-roll, test access point, and circuit switching applications, among others.

FIG. 4, related to dual head-end video broadcasting, illustrates such a network topology that is addressed by the methods and systems of the present invention. In this example, traffic originates at a video server "head end" and is broadcasted to client equipment at each node and continues around the ring. A redundant path traverses the ring in the opposite direction. Traffic is selected from the path with the highest relative signal quality. Because the path is selected based upon relative signal quality, each protected network element (N or NE) 22 must be accessible to both video head ends.

Referring to FIG. 5, using the standards-based cross-connect designs described above, such a network topology would not be possible. An M3100-style multicast cross-connect with a selectable input (via selector 24) is implemented, where the input is the termination point 10 in the ring. This, however, does not provide "drop-and-continue" in both directions on the ring, as traffic only flows from the direction that is selected., i.e. from server 1 or from server 2, not both.

One possible solution using the standards-based model involves performing the selection at the multicast sink termination points when the relative signal quality changes on the input "source" termination points. This requires that each client-facing sink termination point have a pointer to a given multicast cross-connect in order to keep track of its selector state. This is illustrated in FIGS. 6 and 7. Any unprotected drop termination points, however, would have to be managed separately and would further complicate the problem.

The constructs described above become complicated and difficult to manage using conventional methods and systems. The systems must be capable of managing the selector states of the individual drop termination points, and be capable of coordinating the settings of all of the selector states when the signal quality at the server-facing termination points change relative to one another.

Thus, what is still needed in the art are methods and systems for managing matrices of connections within digital switching fabrics, where the sources and sinks in a matrix of connections are the unidirectional connection termination points and novel unidirectional virtual connection point objects. In order to be useful, a virtual connection point must be a logical object that is maintained in software that defines a connection between real network resources, as well as other logical objects. The virtual connection point must have a point of input selection. Due to its unidirectional nature, it would act as a source connection point for multicasting.

BRIEF SUMMARY OF THE INVENTION

In various exemplary embodiments, the present invention provides methods and systems for managing matrices of connections within digital switching fabrics, where the sources and sinks in a matrix of connections are the unidirectional connection termination points (CTPs) and novel unidirectional virtual connection point (VCP) objects. A virtual connection point is a logical object that is maintained in software that defines a connection between real network resources, as well as other logical objects. The virtual connection point has a point of input selection. Due to its unidirectional nature, it acts as a source connection point for multicasting. The use of these virtual connection points enables efficient multicast, drop-and-continue, protection, signaled network connection, bridge-and-roll, test access point, and circuit switching applications, among others.

In one exemplary embodiment of the present invention, a method for managing a matrix of connections within a digital switching fabric includes defining one or more of sources and sinks in a matrix of connections as one or more unidirectional virtual connection points, where each of the one or more unidirectional virtual connection points is a logical object that is maintained in software that defines connections between one or more of network resources and logical objects. The virtual connection points selectively act as origination points for one or more of other virtual connection points and termination points (TPs) in a cross-connect; termination points for one or more of other virtual connection points and origination points in a cross-connect; origination points for a multicast set of connections; intermediate points within a cross-connect for the addition of new connections; selectors for two or more inputs; simultaneously as selectors for two or more inputs and as origination points for a multicast set of connections; one or more of bridges, selectors, and bridge/selectors in a protection application; one or more of origination points and termination points in a signaled network connection; local test access points (TAPs); and/or remote test access points.

In another exemplary embodiment of the present invention, a system for managing a matrix of connections within a digital switching fabric includes an algorithm for defining one or more of sources and sinks in a matrix of connections as one or more unidirectional virtual connection points, where each of the one or more unidirectional virtual connection points is a logical object that is maintained in software that defines connections between one or more of network resources and logical objects. The virtual connection points selectively act as origination points for one or more of other virtual connection points and termination points in a cross-connect; termination points for one or more of other virtual connection points and origination points in a cross-connect; origination points for a multicast set of connections; intermediate points within a cross-connect for the addition of new connections; selectors for two or more inputs; simultaneously as selectors for two or more inputs and as origination points for a multicast set of connections; one or more of bridges, selectors, and bridge/selectors in a protection application; one or more of origination points and termination points in a signaled network connection; local test access points; and/or remote test access points.

In a further exemplary embodiment of the present invention, a method for selectively moving network traffic from one endpoint to another desired endpoint using a plurality of virtual connection points includes, given a source connection termination point, a sink connection termination point, and a desired sink connection termination point, bridging network traffic from the source connection termination point at a first virtual connection point to both the sink connection termination point and the desired sink connection termination point, wherein the first virtual connection point is a logical object that is maintained in software that defines connections between one or more of network resources and logical objects. The method also includes connecting a second virtual connection point to both the sink connection termination point and the desired sink connection termination point, wherein the second virtual connection point is a logical object that is maintained in software that defines connections between one or more of network resources and logical objects, and wherein the second virtual connection point acts as a selector for selecting desired traffic between the source connection termination point and either the sink connection termination point and the desired sink connection termination point. The method further includes selecting the traffic between the source connection termination point and the desired sink connection termination point. Finally, the method includes deleting the sink connection termination point.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention provides methods and systems for managing matrices of connections within digital switching fabrics, where the sources and sinks in a matrix of connections are the unidirectional connection termination points (CTPs) and novel unidirectional virtual connection point (VCP) objects. A virtual connection point is a logical object that is maintained in software that defines a connection between real network resources, as well as other logical objects. The virtual connection point has a point of input selection. Due to its unidirectional nature, it acts as a source connection point for multicasting.

Figure 8:
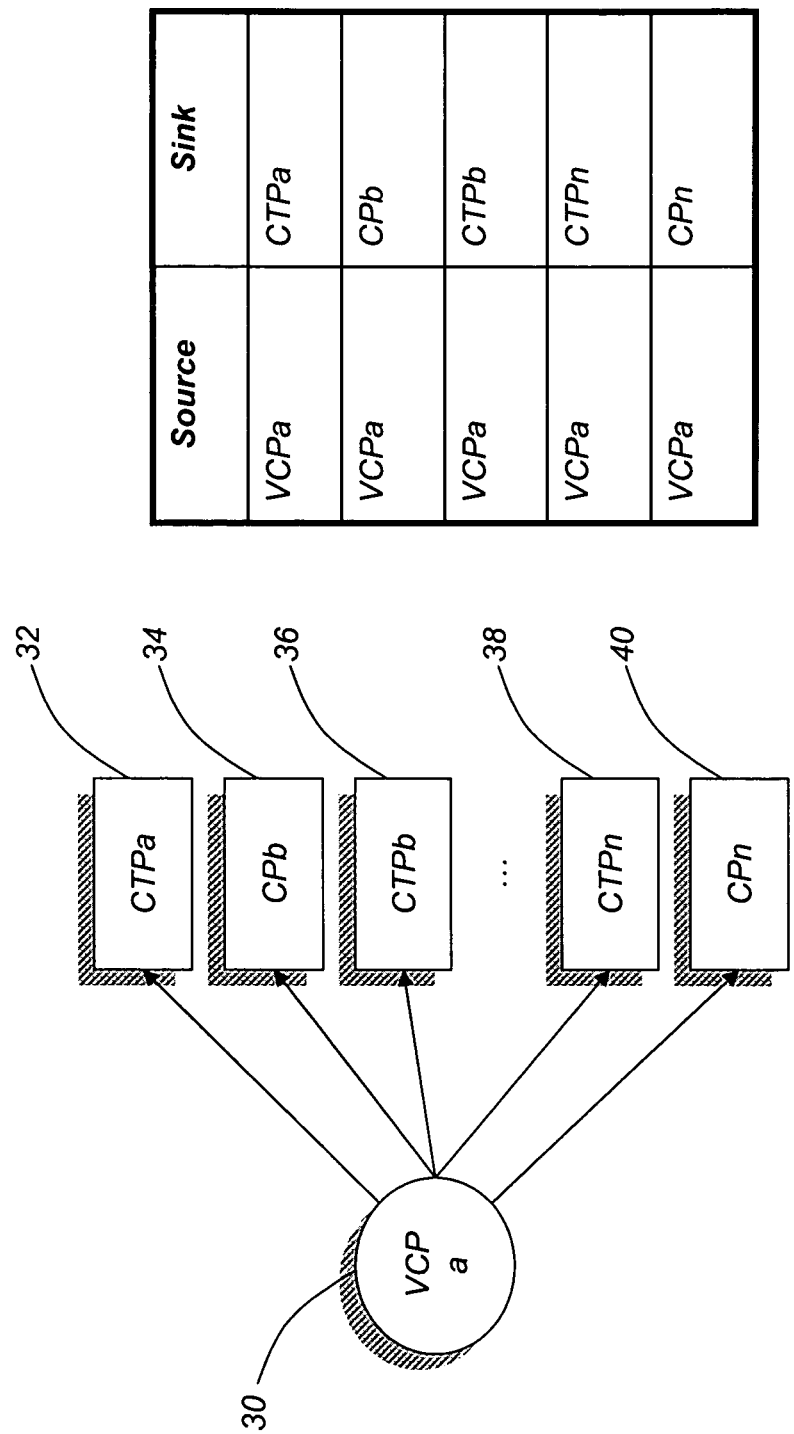
FIG. 8 is a schematic diagram illustrating a case in which a virtual connection point (VCP) acts as an origination point for a multicast set of connections, in accordance with the methods and systems of the present invention.
Figure 9:
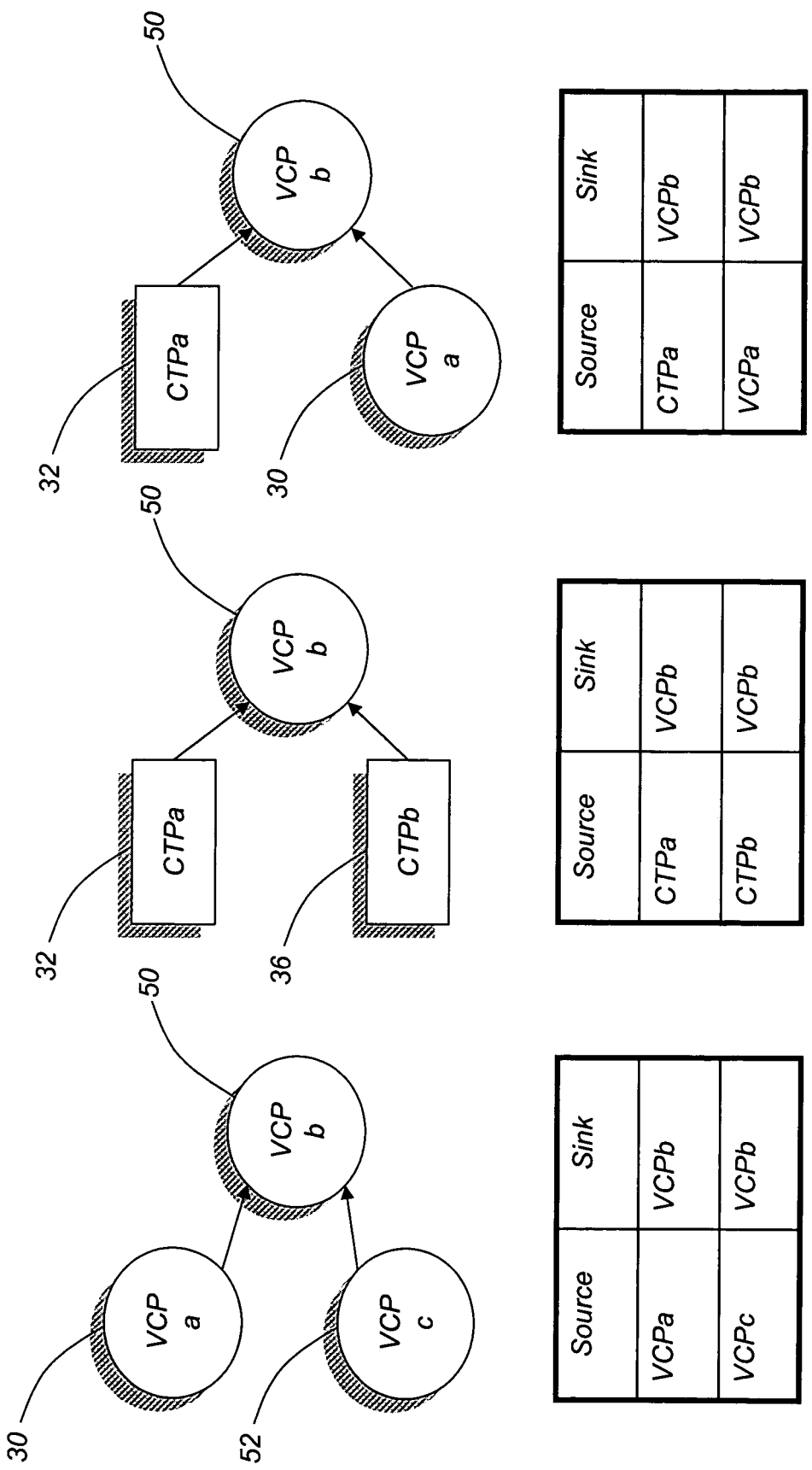
FIG. 9 is a schematic diagram illustrating a case in which a virtual connection point acts as a selector for two or more inputs, in accordance with the methods and systems of the present invention.

The methods and systems of the present invention use virtual connection points to form the following connections, among others: 1) the virtual connection point acts as an origination point for other virtual connection points or termination points (TPs) in the cross-connect; 2) the virtual connection point acts as a termination point for other virtual connection points or origination points in the cross-connect; 3) the virtual connection point acts as an origination point for a multicast set of connections (this is illustrated in FIG. 8, including VCPa 30, CTPa 32, CPb 34, CTPb 36, CTPn 38, and CPn 40); 4) the virtual connection point acts as an intermediate point within the cross-connect for the addition of new connections; 5) the virtual connection point acts as a selector for two or more inputs (this is illustrated in FIG. 9, including VCPa 30, CTPa, 32, CTPb 36, VCPb 50, and VCPc 52); and 6) the virtual connection point acts simultaneously as a selector for two or more inputs and as an origination point for a multicast set of connections.

Referring to FIG. 8, in one exemplary embodiment of the present invention, a virtual connection point (VCPa 30) acts as origination point for a multicast set of connections, including connection termination points CTPa 32, CTPb 36, and CTPn 38, as well as virtual connection points CPb 34 and CPn 40.

Referring to FIG. 9, in another exemplary embodiment of the present invention, a virtual connection point (VCPb 50) acts as a selector for two or more inputs. The two or more inputs include virtual connection points VCPa 30 and VCPc 52, connection termination points CTPa 32 and CTPb 36, and connection termination point CTPa 32 and virtual connection point VCPa 30, respectively.

In general, in accordance with the methods and systems of the present invention, the standards-based cross-connect is replaced by a set of connections where the sources and sinks are the unidirectional components of the connection termination points and novel virtual connection point objects. The unidirectional components of the connection termination points and novel virtual connection point objects can be provisioned as either sources or sinks of the set.

Figure 10:
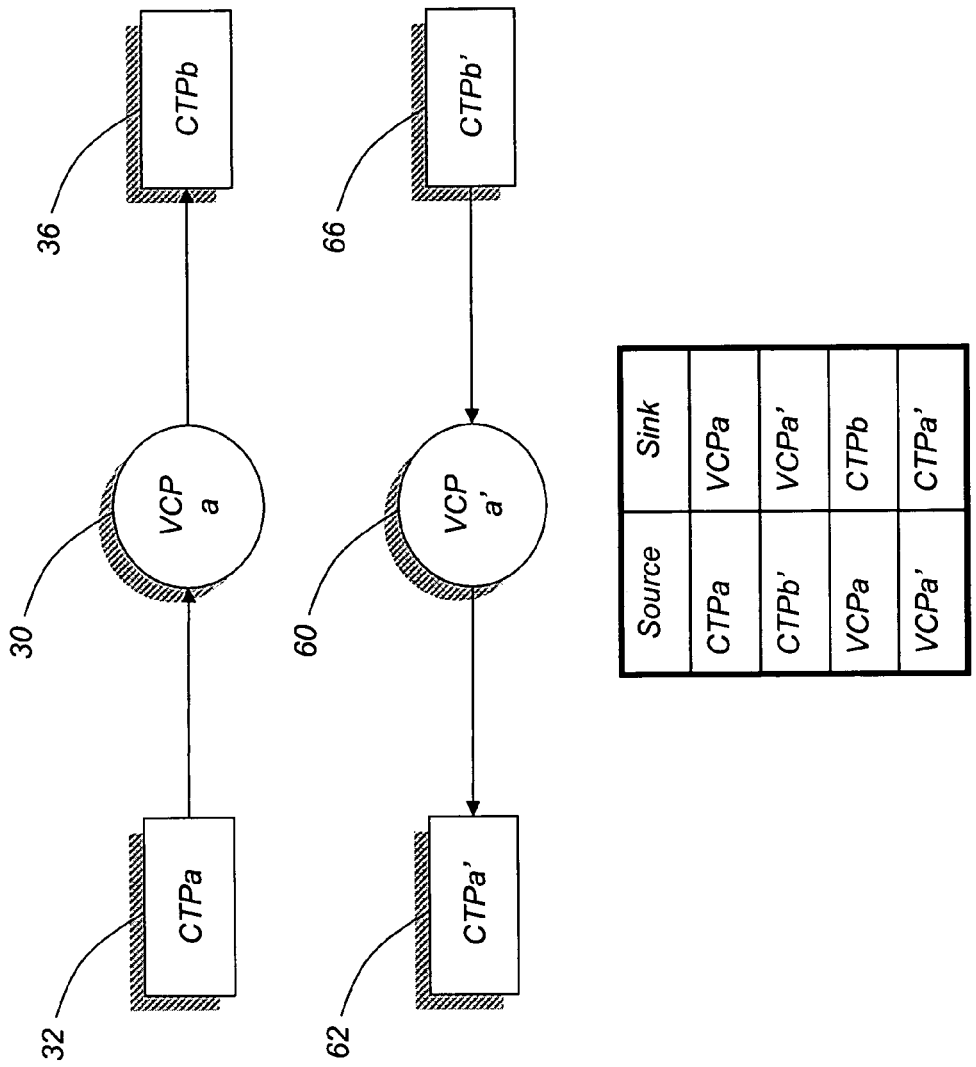
FIG. 10 is a schematic diagram illustrating a case in which a bi-directional cross-connect between two bi-directional termination points is broken down into its unidirectional elements and represented as a virtual connection point-based set of connections, in accordance with the methods and systems of the present invention.

A bi-directional cross-connect between two bi-directional termination points can be broken down into its unidirectional elements and represented as a virtual connection point-based set of connections, as illustrated in FIG. 10, including VCPa 30, CTPa 32, CTPb 36, VCPa' 60, CTPa' 62, and CTPb' 66.

The connection matrix of the present invention can scale in such a way that individual connections can be added and deleted from the set without disrupting traffic. This is similar to the prior art in that individual termination point "legs" of a multicast can be added and deleted without affecting other connections, but, in the case of the present invention, the sources and sinks can be virtual connection points connected to other virtual connection points.

Figure 1:
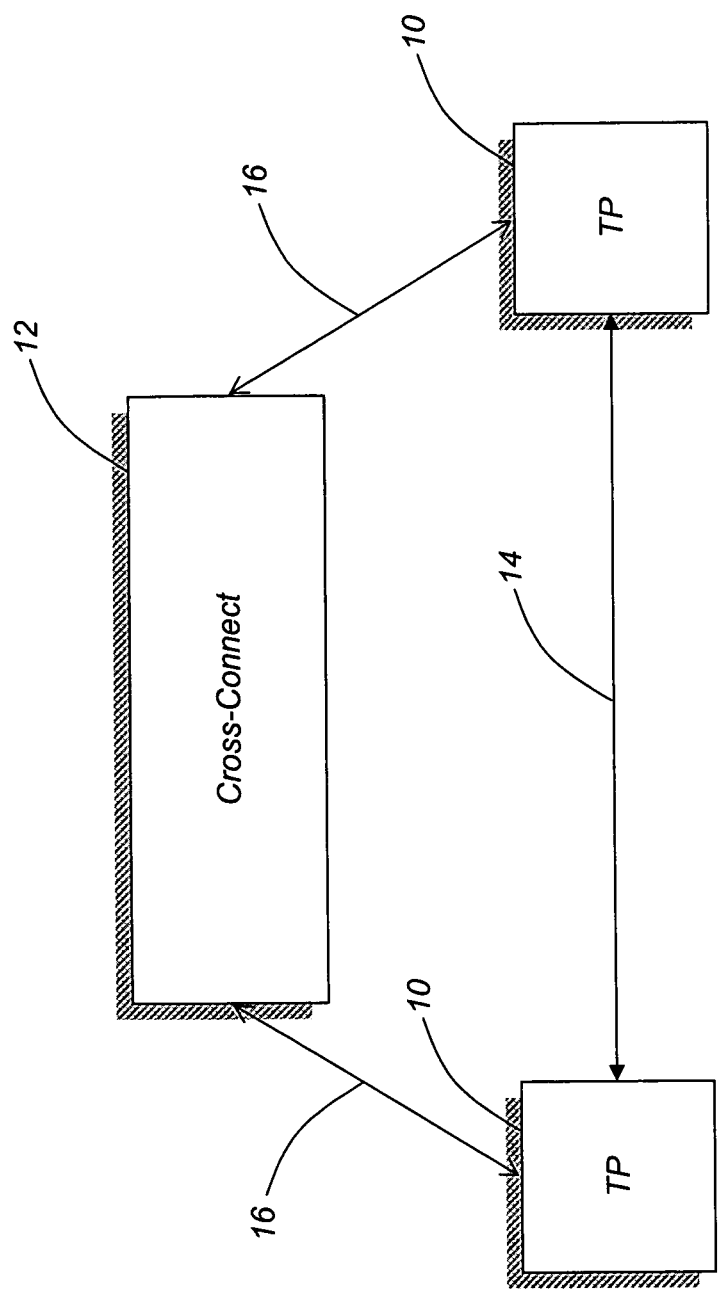
FIG. 1 is a schematic diagram illustrating a conventional point-to-point cross-connect configuration between two termination points (TPs)
Figure 2:
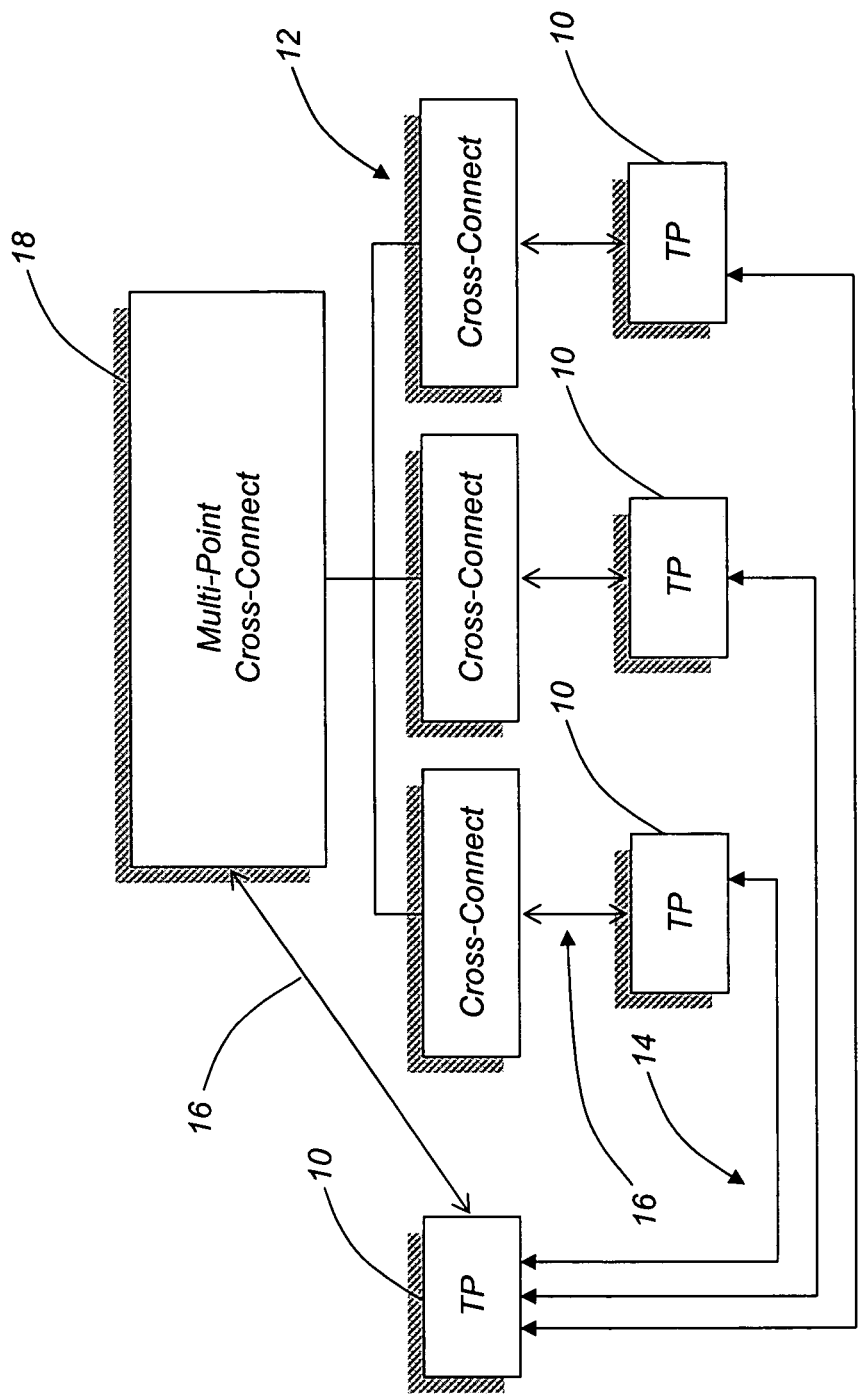
FIG. 2 is a schematic diagram illustrating a conventional multicast configuration between a plurality of termination points.
Figure 3:
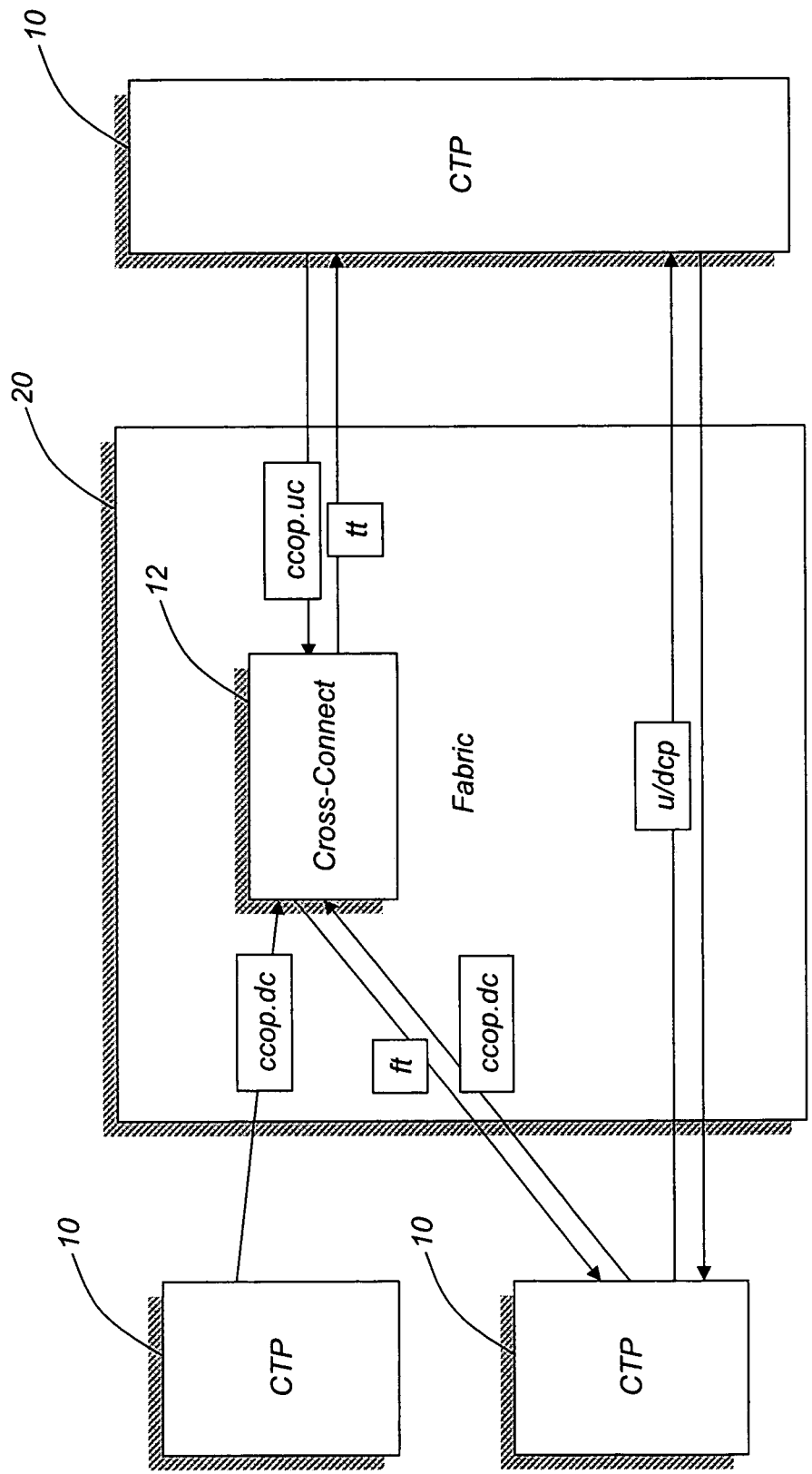
FIG. 3 is a schematic diagram illustrating a conventional cross-connect configuration in bridge-and-roll.
Figure 4:
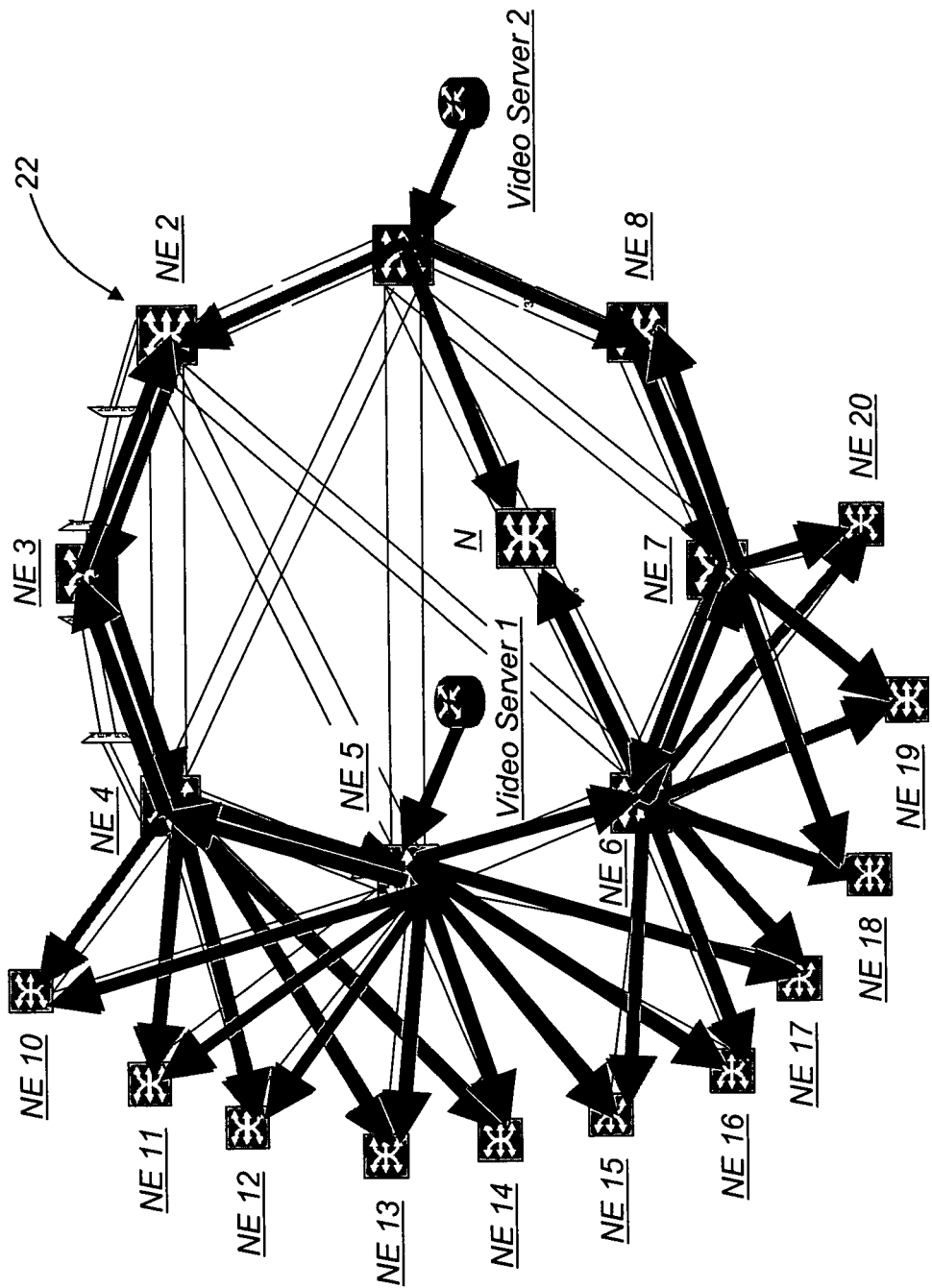
FIG. 4 is a schematic diagram illustrating a conventional dual head-end video broadcasting network topology.
Figure 5:
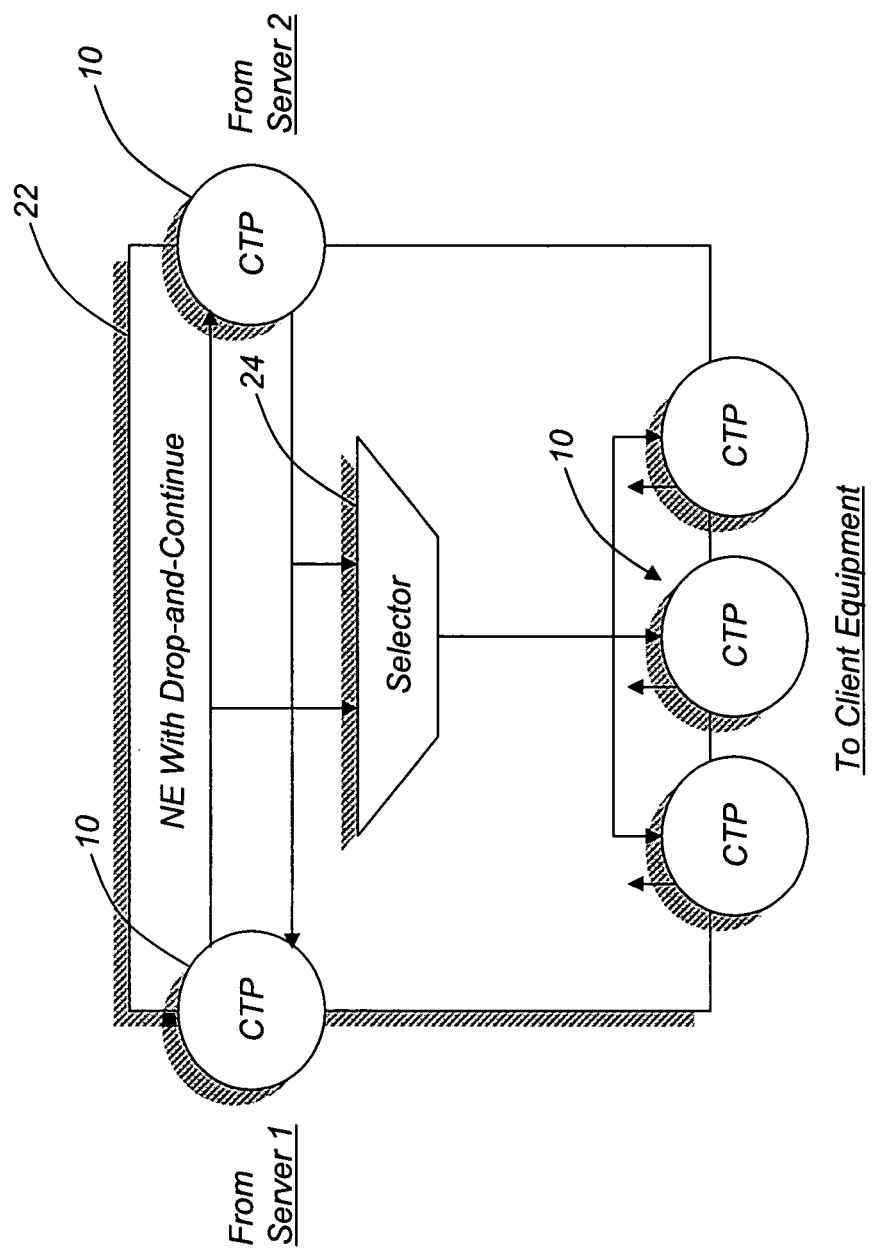
FIG. 5 is another schematic diagram illustrating a conventional dual head-end video broadcasting network topology, highlighting the problems associated with providing drop-and-continue operation in both directions on a ring.
Figure 6:
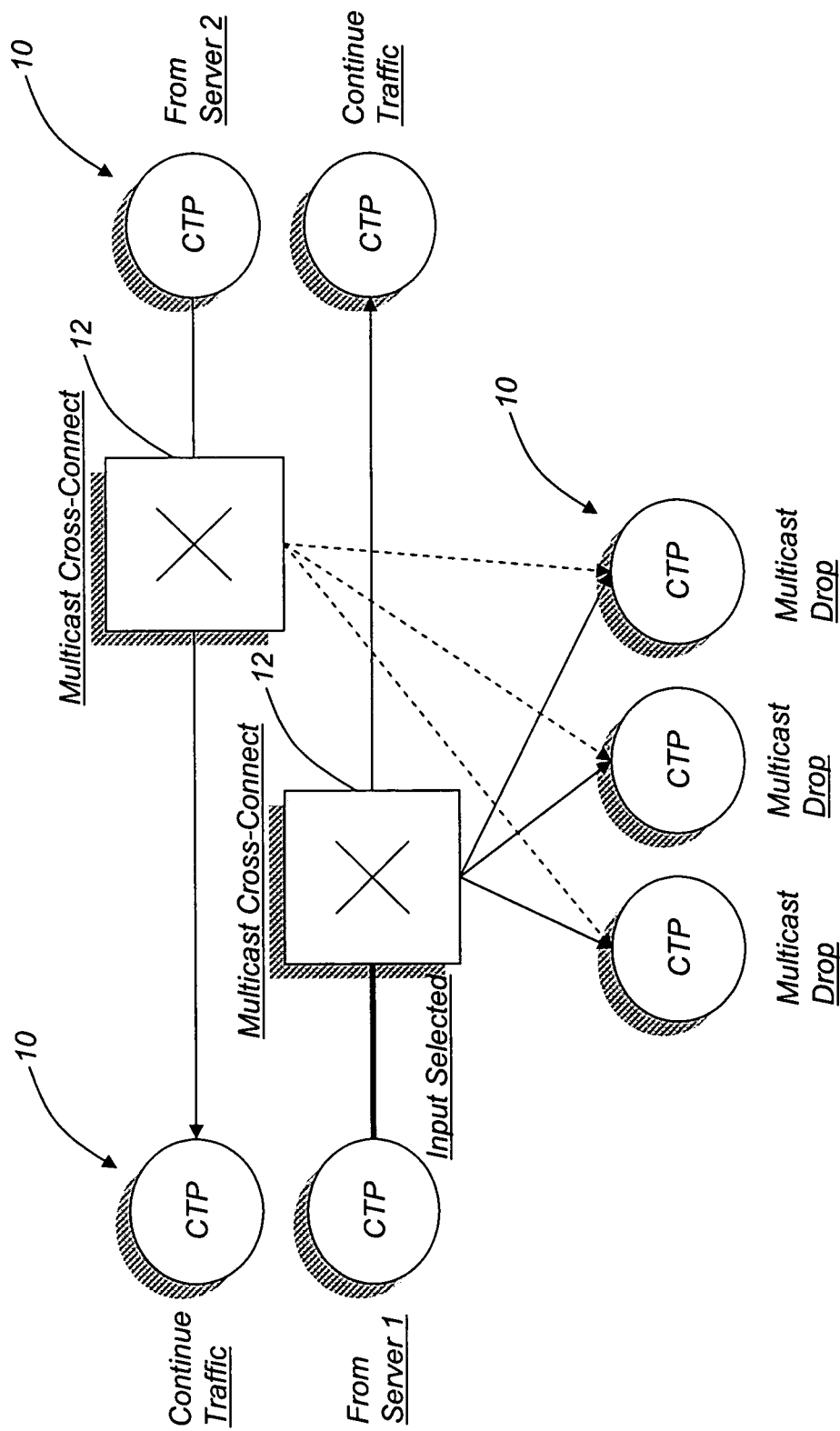
FIG. 6 is a schematic diagram illustrating conventional selection at sink termination points.
Figure 7:
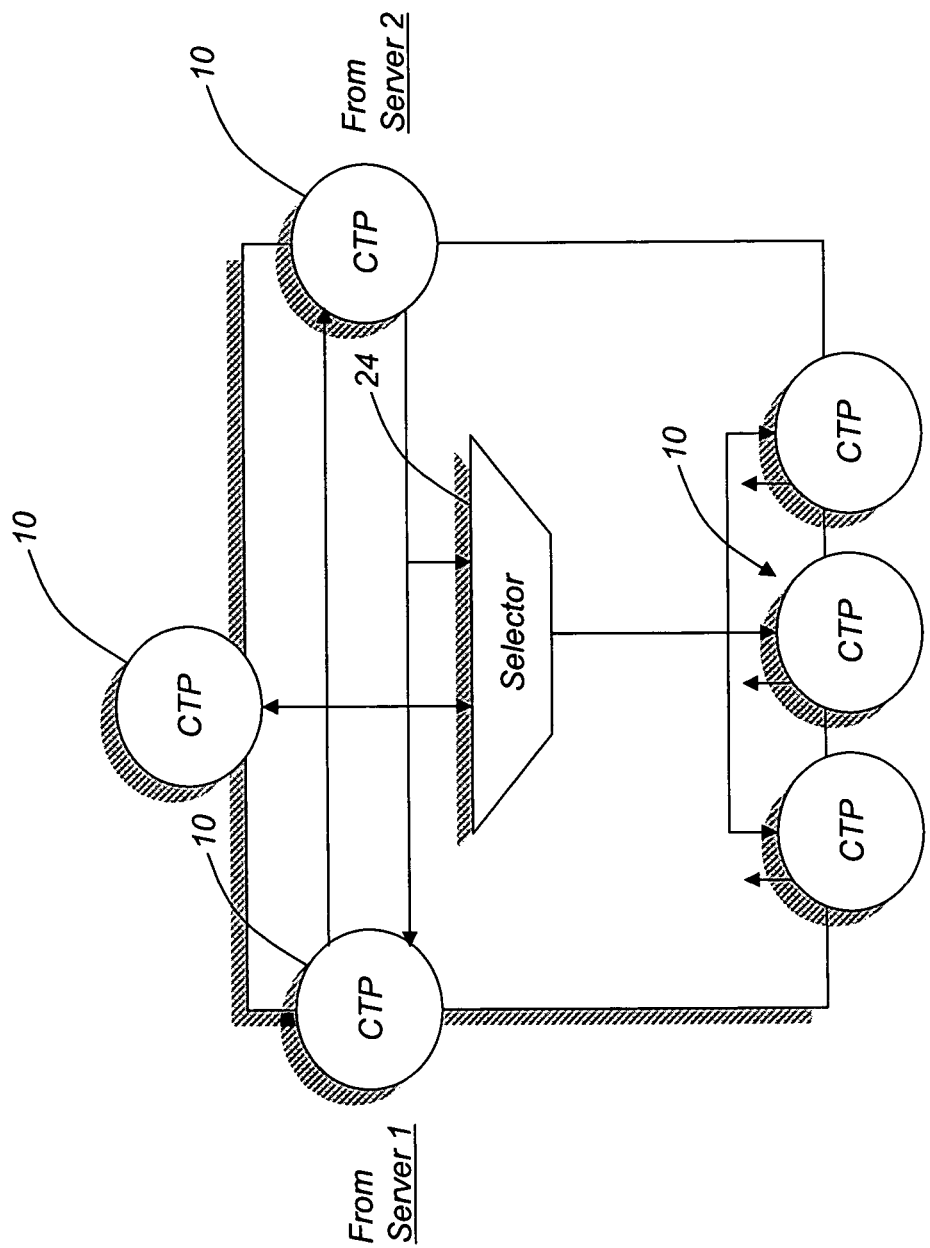
FIG. 7 is a schematic diagram illustrating conventional protected and unprotected multicast drops.

By interconnecting virtual connection points, one can construct a set of connections that can support protected multicast/drop-and-continue application without the disruption of traffic on the ring. This general application is illustrated in FIG. 4, related to dual head-end video broadcasting. These structures are not supported by the models of the prior art.

Figure 11:
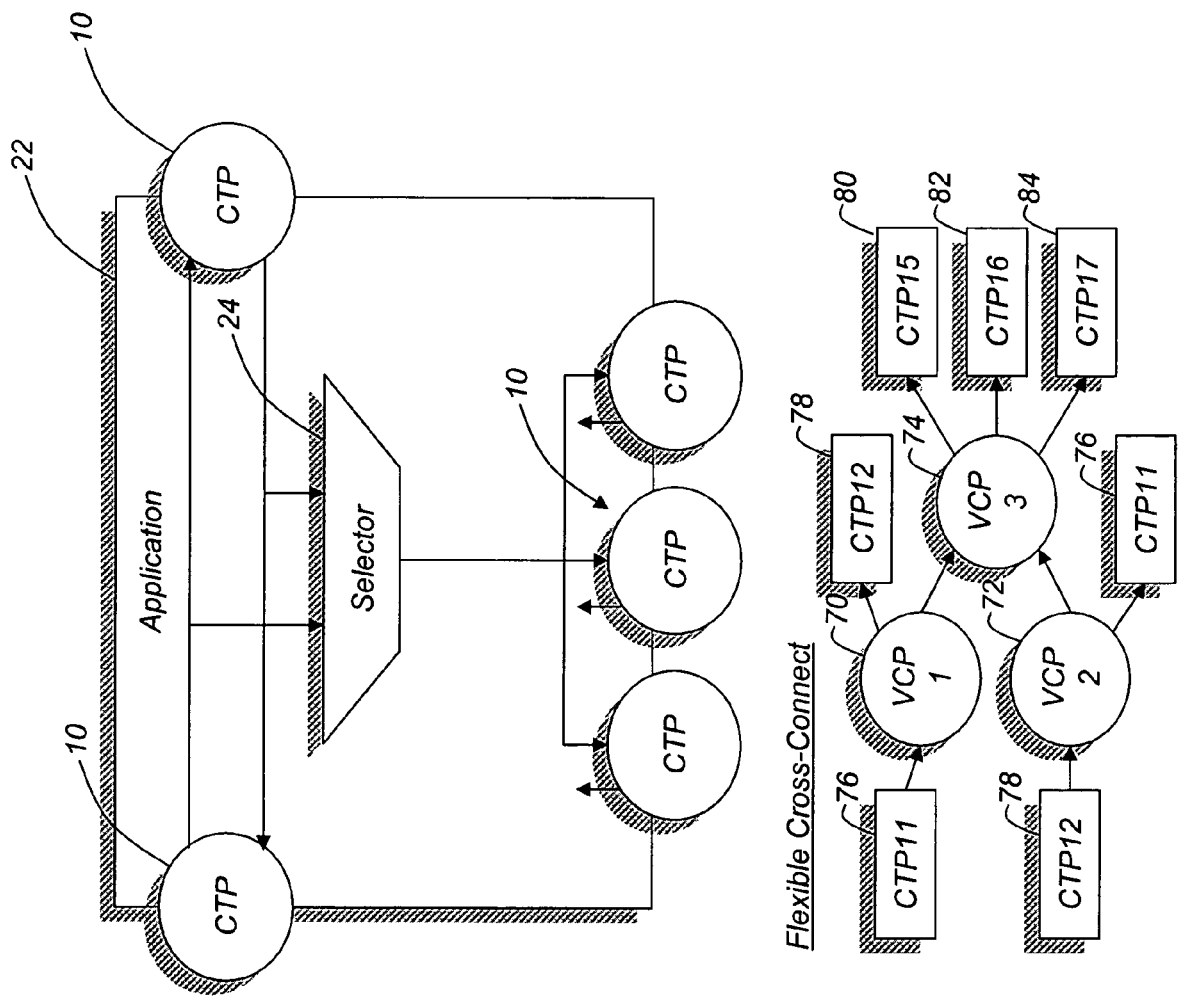
FIG. 11 is a schematic diagram illustrating a case in which a connection is added from an intermediate virtual connection point to another virtual connection point, which then acts as a selector and/or a source for a single connection or a set of multicast connections, in accordance with the methods and systems of the present invention.

The methods of the present invention allow a connection to be added from an intermediate virtual connection point to another virtual connection point, which can then act as both a selector and/or a source for a single connection or a set of multicast connections, as illustrated in FIG. 11, including VCP1 70, VCP2 72, VCP3 74, CTP11 76, CTP12 78, CTP15 80, CTP16 82, and CTP17 84. This structure can also be created by adding connections to the bi-directional cross-connect structure illustrated in FIG. 10 without interruption of traffic on the original connections. It should be noted that additional protected or unprotected drop termination points can be added to the set. For example, a new connection termination point can be defined as a sink with respect to VCP1 70. Because VCP3 74 is performing the selection, no special behavior needs to be defined to distinguish protected drop termination points from unprotected drop termination points.

In general, the methods and systems of the present invention provide a unidirectional managed virtual connection point object that can be used as a source and/or a sink in a digital switching fabric. The methods and systems of the present invention also provide a managed virtual connection point source object for multicast connection applications, including drop-and-continue applications. Finally, the methods and systems of the present invention provide a managed virtual connection point sink object that acts as a selector switch in applications including, but not limited to, connection bridge-and-roll, SNCP/USPR protection, APS 1+1 protection, and BLSR/SPRing protection. In these cases, the virtual connection point is unique in that it can act as a selector for other virtual connection point objects, as well as termination points defined in the prior art. The methods and systems of the present invention allow for the scaling of a set of connections through the addition or deletion of connections to the virtual connection point without interrupting other traffic that is flowing through the virtual connection point. This includes creating drop-and-continue connections on a virtual connection point already participating in a point-to-point or point-to-multipoint connection, and/or adding an additional source termination point or virtual connection point to form a selector on a virtual connection point already participating in a point-to-point or point-to-multipoint connection. The methods and systems of the present invention also allow a virtual connection point acting as a selector to be the input source for another virtual connection point that is also acting as a selector, i.e. cascaded selectors. The connections between any two virtual connection points define logical relationships and do not require the use of any network resources. Likewise, connections include multicast/broadcast "bridged" connections from a virtual connection point to multiple termination points. Finally, connections include selector switch connections from two distinct termination points to a virtual connection point, from two distinct virtual connection points to another virtual connection point, or from a termination point and a virtual connection point.

Figure 12:
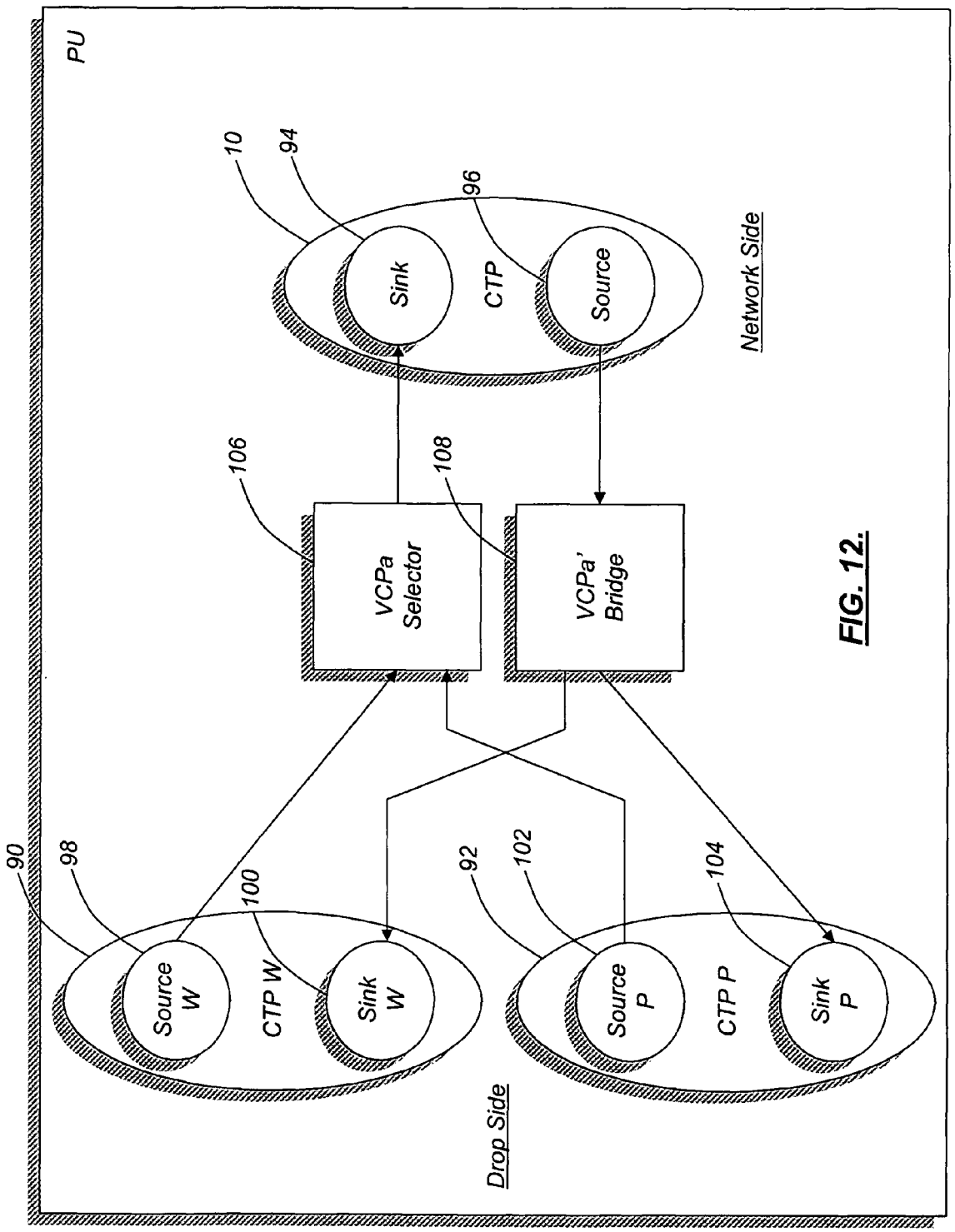
FIG. 12 is a schematic diagram illustrating a signaled network connection protection (SNCP) implementation, in accordance with the methods and systems of the present invention.
Figure 13:
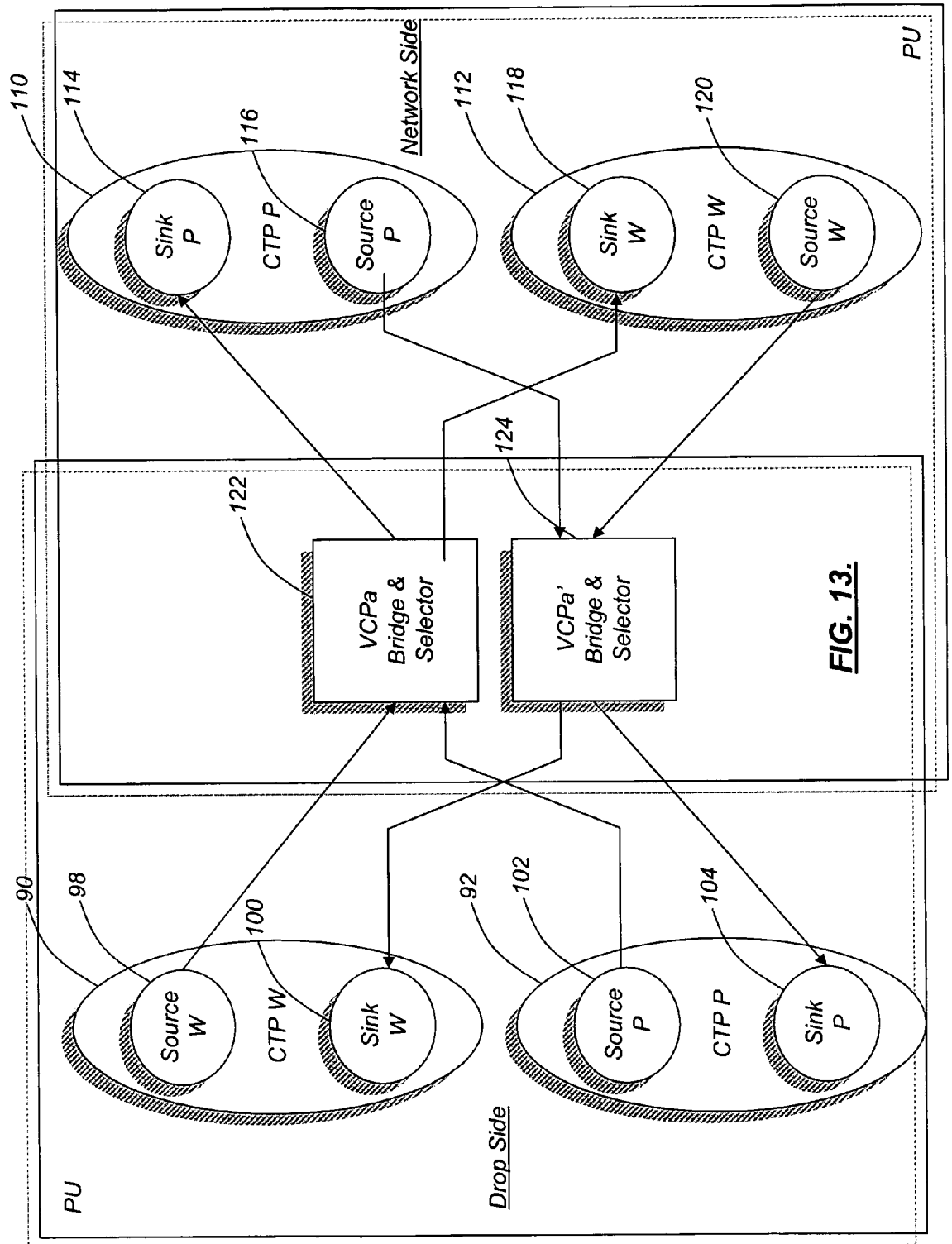
FIG. 13 is another schematic diagram illustrating a signaled network connection protection implementation, in accordance with the methods and systems of the present invention.

It should be noted that any protection application that uses a bridge and/or a selector can advantageously make use of the virtual connection points of the present invention, as the virtual connection points can each act as a bridge and/or a selector, as described above. For example, two signaled network connection protection implementations are illustrated in FIGS. 12 (i.e. SNCP-1) and 13 (i.e. SNCP-2). FIG. 12 includes a network side connection termination point 10, including a sink 94 and a source 96, coupled to a drop side connection termination point W (i.e. work) 90, including a source W 98 and a sink W 100, and a drop side connection termination point P (i.e. protect) 92, including a source P 102 and a sink P 104, via a selector 106 and a bridge 108. The selector 106 and/or the bridge 108 are replaced by virtual connection point(s) in accordance with the methods and systems of the present invention. A typical implementation utilizes a pair of virtual connection points, replacing both the bridge and the selector. An SNCP PU can be created from an existing bi-directional cross-connect that utilizes virtual connection points. This can be further modified to support "back-to-back" SNCP, as illustrated in FIG. 13. FIG. 13 includes a drop side connection termination point W 90, including a source W 98 and a sink W 100, and a drop side connection termination point P 92, including a source P 102 and a sink P 104, coupled to a network side connection termination point P 110, including a sink P 114 and a source P 116, and a network side connection termination point W 112, including a sink W 118 and a source W 120, via a bridge/selector 122 and a bridge/selector 124. The bridge/selector 122 and/or the bridge/selector 124 are replaced by a virtual connection point in accordance with the methods and systems of the present invention. A typical implementation utilizes a pair of virtual connection points, replacing both the bridge/selectors.

A flexible signaled network connection (SNC) is defined herein as signaled network connection that terminates and/or originates on a logical virtual connection point object. Such a signaled network connection can be considered as terminating on a given network element, as opposed to terminating on a given port. This functionality allows for the movement of physical termination points (as in a connection-level bridge-and-roll application) without the need for deleting the signaled network connection. Other applications that exploit signaled network connections include arbitrary signaled network connection protection, where the work and protect drop connection termination points of the signaled network protection can be altered without the need for deleting the signaled network connection. The signaled network connection-based flexible cross-connect includes source CTPa (line side CTP), sink VCPa (origination point); source VCPa' (origination point), sink CTPa; source CTPb (line side CTP), sink VCPb (termination point); and source VCPb' (termination point), sink CTPb.

Figure 14:
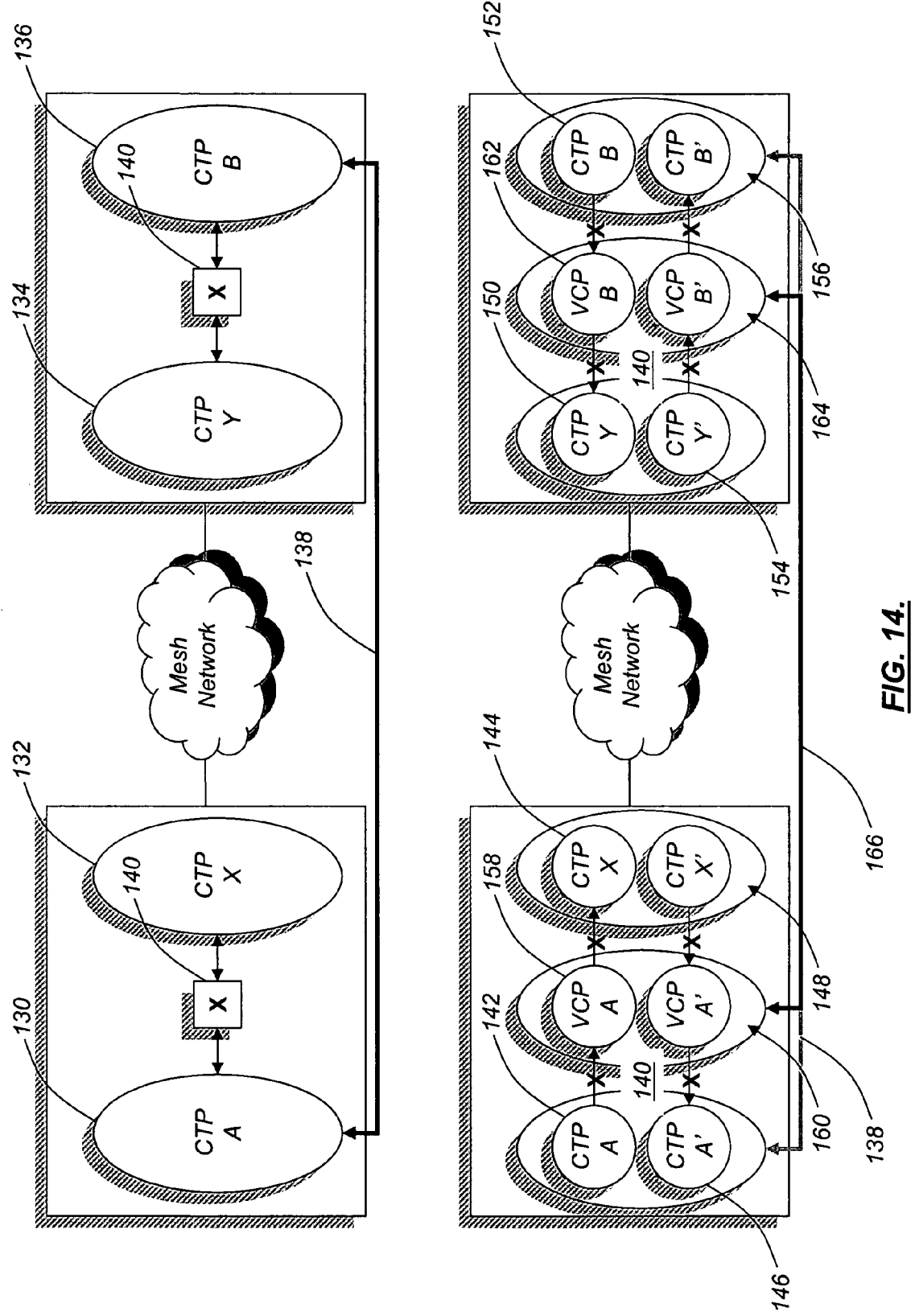
FIG. 14 is a schematic diagram illustrating a method for transforming a conventional signaled network connection (SNC) into the flexible signaled network connection of the present invention.

Referring to FIG. 14, the transformation of a conventional signaled network connection into a flexible signaled network connection of the present invention includes replacing a plurality of connection termination points (CTP A 130, CTP X 132, CTP Y 134, and CTP B 136) on either end of the signaled network connection 138 and linked by a plurality of cross-connects 140 with a plurality of connection termination points (CTP A 142, CTP X 144, CTP A' 146, CTP X' 148, CTP Y 150, CTP B 152, CTP Y' 154, and CTP B' 156) and a plurality of virtual connection points (CP A 158, CP A' 160, CP B 162, and CP B') linked by a plurality of cross connects 140. The flexible signaled network connection 166 is moved to the plurality of virtual connection points.

It should be noted that the signaled network connection described above can terminate on one or more virtual connection points participating in a multicast, for example. In other words, the signaled network connection described above can be combined with any of the other embodiments described herein. The signaled network connections can be restorable or permanent, as appropriate.

Figure 15:
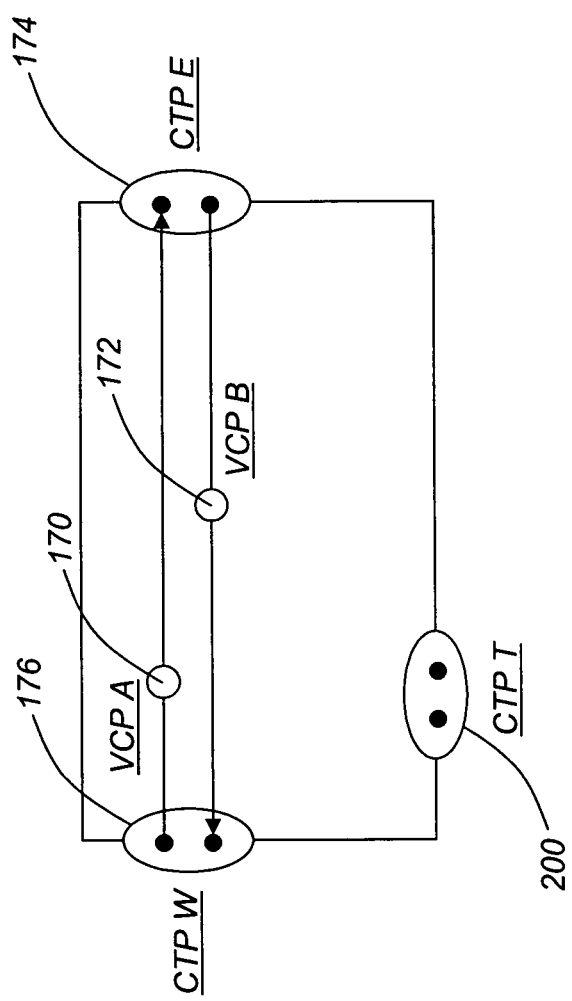
FIG. 15 is a schematic diagram illustrating a first step in a bridge-and-roll application utilizing a plurality of virtual connection points, in accordance with the methods and systems of the present invention.
Figure 16:
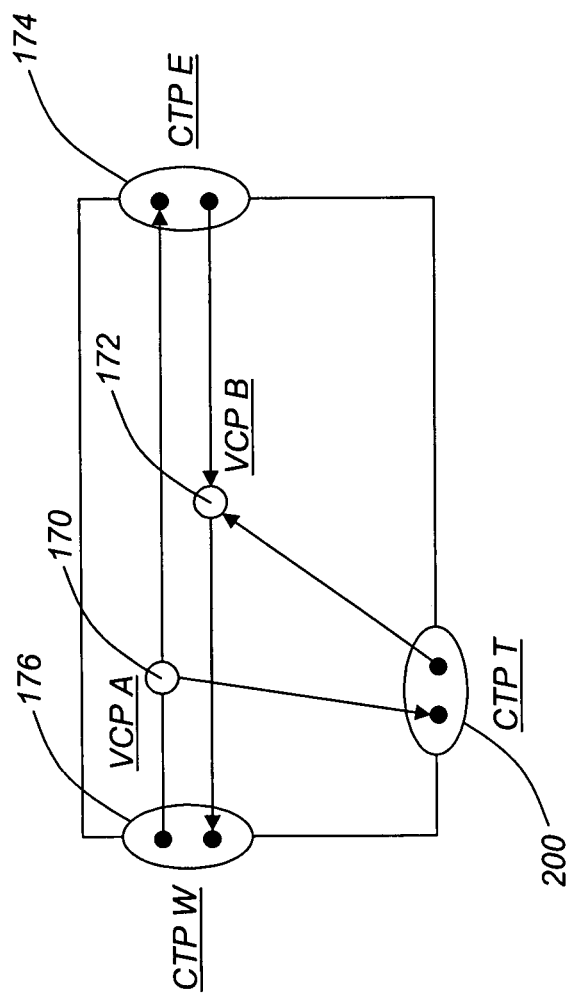
FIG. 16 is another schematic diagram illustrating a second step in a bridge-and-roll application utilizing a plurality of virtual connection points, in accordance with the methods and systems of the present invention.
Figure 17:
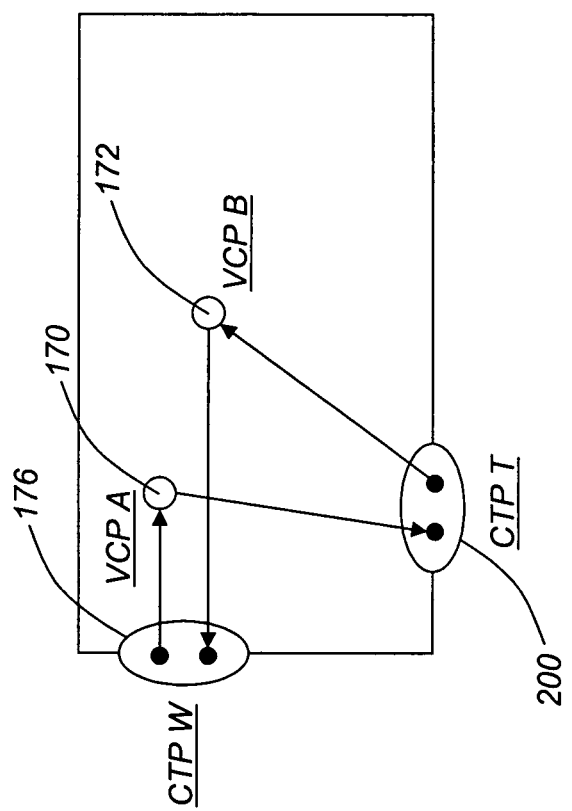
FIG. 17 is a further schematic diagram illustrating a third step in a bridge-and-roll application utilizing a plurality of virtual connection points, in accordance with the methods and systems of the present invention.

In general, bridge-and-roll is used to move traffic from one endpoint to another desired endpoint for maintenance or traffic consolidation activities. This is illustrated, in a step-by-step manner, in FIGS. 15-17. Referring to FIG. 15, a normal bi-directional cross-connect between CTP E 174 and CTP W 176 is illustrated. A user desires to move the traffic off of CTP E 174 to CTP T 200. Referring to FIG. 16, the traffic is bridged at VCP A 170 to both CTP E 174 and CPT T 200. By adding CTP T 200 to VCP B 172, VCP B 172 is made a selector. VCP B 172 is now capable of selecting the best signal received between CTP E 174 and CTP T 200. It should be noted that VCP B 172 is still selecting traffic from CTP E 174 at this point. The user moves the traffic off of CTP E 174, which forces selector VCP B 172 to select the traffic from CTP T 200. Once the traffic is flowing over CTP T 200, the user can delete CTP E 174 from the connection, as illustrated in FIG. 17.

Figure 18:
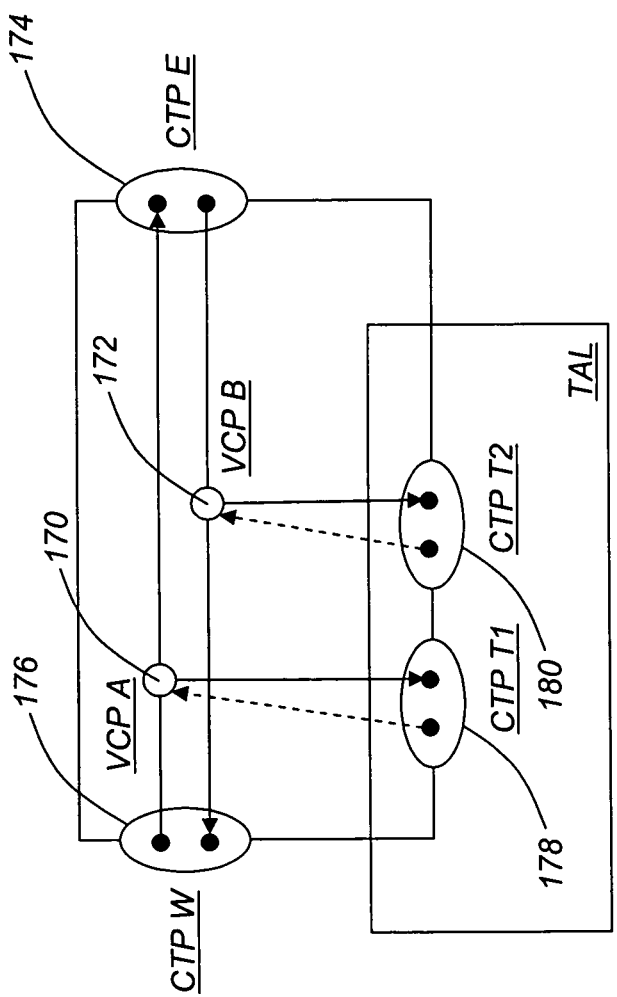
FIG. 18 is a schematic diagram illustrating a method for creating a test access point (TAP), in this case a local test access point involving east and west ports, in accordance with the present invention.
Figure 19:
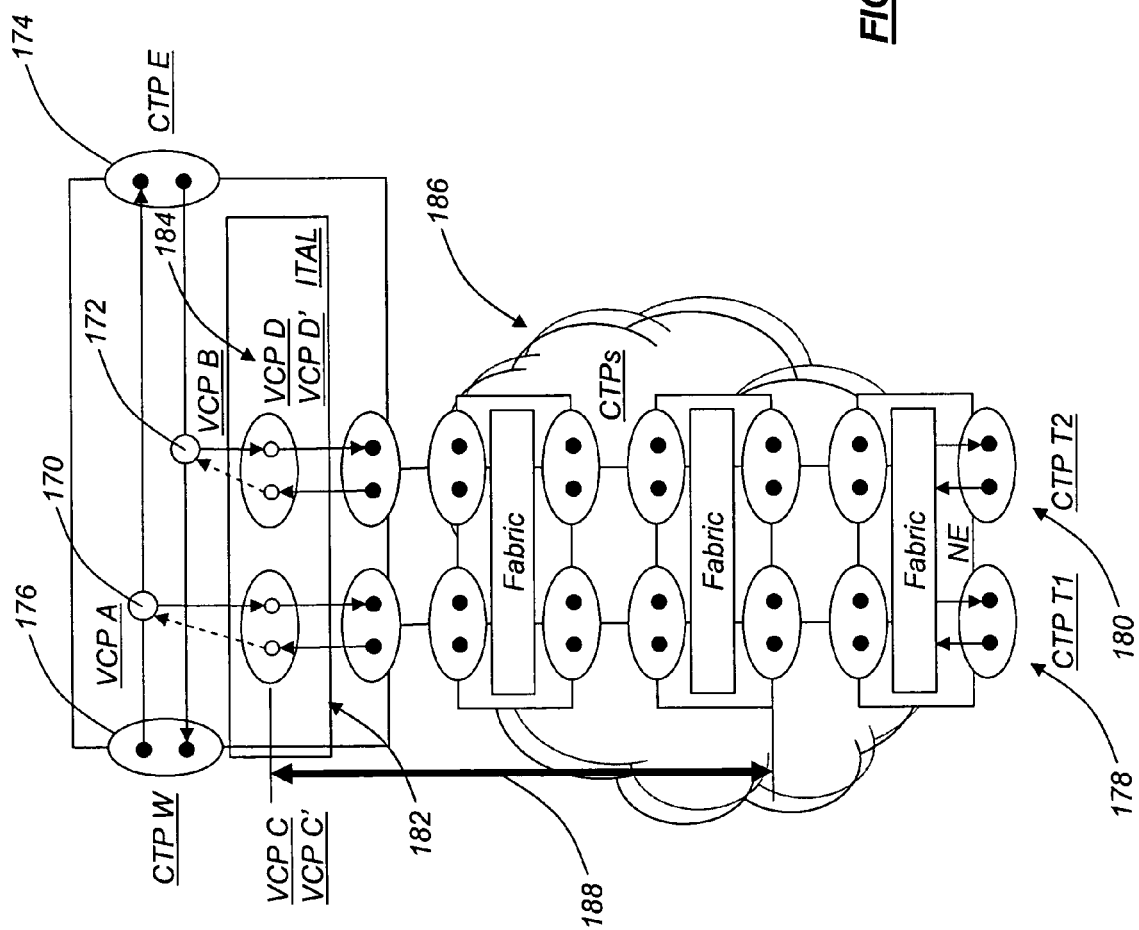
FIG. 19 is another schematic diagram illustrating a method for creating a test access point, in this case a remote test access point involving east and west ports, in accordance with the present invention.

Referring to FIGS. 18 and 19, the virtual connection points of the present invention may be used to create test access points. FIG. 18 illustrates one exemplary embodiment in which a local test access point is created between east and west ports. Specifically, VCP A 170 and VCP B 172 (virtual connection points) are inserted between CTP E 174 and CTP W 176 (the east and west connection termination points). The test access point is directly run off of VCP A 170 and VCP B 172 at CTP T1 178 and CTP T2 180. The test access point is used for accessing customer traffic for testing purposes. FIG. 19 illustrates another exemplary embodiment in which a remote test access point incorporating a signaled network connection is created between east and west ports. Specifically, VCP A 170 and VCP B 172 (virtual connection points)

are inserted between CTP E 174 and CTP W 176 (the east and west connection termination points). The test access point is indirectly run off of VCP A 170 and VCP B 172 at CTP T1 178 and CTP T2 180 via VCP C and VCP C' 182, VCP D and VCP D' 184, and a plurality of connection termination points associated with a plurality of fabrics, the configuration as a whole incorporating a signaled network connection 188. Again, the test access point is used for accessing customer traffic for testing purposes.

It should be noted that live traffic may be accessed in monitor modes or in split modes. In monitor modes, live traffic may be accessed in a unidirectional manner to the test equipment. In split modes, however, test traffic may be injected into the network. Different qualifiers may be used to specify the accessing of live traffic either before or after the selector. First, a test access link (TAL) is created at the network element. A test access link is defined as a dedicated pair of connection termination points, semi-permanently connected to a test set. A tap connection is created from a target connection termination point using different modes (MON_E, MON_F, MON_EF, SPLT_E, SPLY_F, SPLT_EF, etc.) and different qualifiers (SELF or PROTECT—before selector, and COMMON—after selector).

In the case of a remote test access point, the imaginary test access link (ITAL) represents a barrier between internal test access behavior and external connectivity, each of which behaves normally according to its nature. The imaginary test access link is a set of virtual connection points. The signaled network connection is then used to connect the remote network element to the test equipment. Once the signaled network connection is established to the imaginary test access link, the other side may be established in any modes and using any qualifiers described above.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method comprising:
providing a system to manage a matrix of connections within a digital switching fabric, the system configured to perform the steps of:
defining, in software, unidirectional virtual connection points modeling connections in the digital switching fabric, wherein the unidirectional virtual connection points are logical objects that are maintained in the software and define connections between network resources on actual hardware modeled with connection objects in the software;
managing the matrix of connections, in the software, with a set of connection objects in the software, in which sources and sinks in the matrix of connections are represented by unidirectional connection termination points and the unidirectional virtual connection points;
managing a bidirectional connection in the matrix of connections, utilizing a bidirectional connection structure comprising a first pair of unidirectional connection termination points and a second pair of unidirectional connection termination points with a first unidirectional virtual connection point disposed between the first pair and a second unidirectional virtual connection point disposed between the second pair; and
wherein a cross-connect is modeled by the addition of unidirectional connection termination points and unidirectional virtual connection points to another bidirectional connection structure without interruption of traffic on the original connections thereof, in which at least one unidirectional virtual connection point acts as a selector for two or more inputs comprising at least one other unidirectional virtual connection point that is not a termination point, and as a source for two or more outputs.

2. The method of claim 1, wherein a unidirectional virtual connection point acts as an origination point for one or more of other virtual connection points and unidirectional connection termination points.

3. The method of claim 1, wherein a unidirectional virtual connection point acts as a termination point for one or more of other unidirectional virtual connection points and origination points.

4. The method of claim 1, wherein a unidirectional virtual connection point acts as an origination point for a multicast set of connections.

5. The method of claim 1, wherein a unidirectional virtual connection point acts as an intermediate point for the addition of new connections to the matrix of connections.

6. The method of claim 1, wherein a unidirectional virtual connection point acts as a selector for two or more inputs, and wherein the two or more inputs include one or more of two or more unidirectional virtual connection points, two or more unidirectional connection termination points, and a unidirectional virtual connection point and a unidirectional connection termination point.

7. The method of claim 6, wherein the unidirectional virtual connection point acts simultaneously as the selector for the two or more inputs and as an origination point for a multicast set of connections.

8. The method of claim 1, wherein a unidirectional virtual connection point acts as one or more of a bridge, a selector, and a bridge/selector in a protection application.

9. The method of claim 1, wherein a unidirectional virtual connection point is used to create a local or remote test access point, wherein the local or remote test access point is configured in either a monitor mode or a split mode, and wherein the monitor mode comprises a unidirectional connection to test equipment and the split mode comprises injecting test traffic.

10. The method of claim 1, wherein the use of unidirectional virtual connection points enables multicast, drop-and-continue, protection, signaled network connection, bridge-and-roll, test access point, and circuit switching applications.

11. The method of claim 10, wherein through the use of the unidirectional virtual connection points, the cross-connect model relationship is not required to be defined between two termination points.

12. The method of claim 1, wherein the unidirectional connection termination points are standards based network object models for managing the matrix of connections.

13. A system for managing a matrix of connections within a digital switching fabric, the system comprising:
a digital switching fabric comprising a matrix of connections;
an algorithm for managing the matrix of connections within the digital switching fabric,
wherein the algorithm is executed by a processor and comprises the steps of:
defining, in software, unidirectional virtual connection points modeling connections in the digital switching fabric, wherein the unidirectional virtual connection points are logical objects that are maintained in the software and define connections between network resources on actual hardware modeled with connection objects in the software;

managing the matrix of connections, in the software, with a set of connection objects in the software, in which sources and sinks in the matrix of connections are represented by unidirectional connection termination points and the unidirectional virtual connection points, managing a bidirectional connection in the matrix of connections, utilizing a bidirectional connection structure comprising a first pair of unidirectional connection termination points and a second pair of unidirectional connection termination points with a first unidirectional virtual connection point disposed between the first pair and a second unidirectional virtual connection point disposed between the second pair; and wherein a cross-connect is modeled by the addition of unidirectional connection termination points and unidirectional virtual connection points to another bidirectional connection structure without interruption of traffic on the original connections thereof, in which at least one unidirectional virtual connection point acts as a selector for two or more inputs comprising at least one other unidirectional virtual connection point that is not a termination point, and as a source for two or more outputs.

14. The system of claim 13, wherein a unidirectional virtual connection point acts as an origination point for one or more of other unidirectional virtual connection points and unidirectional termination points.

15. The system of claim 13, wherein a unidirectional virtual connection point acts as a termination point for one or more of other unidirectional virtual connection points and origination points.

16. The system of claim 13, wherein a unidirectional virtual connection point acts as an origination point for a multicast set of connections.

17. The system of claim 13, wherein a unidirectional virtual connection point acts as an intermediate point for the addition of new connections to the matrix of connections.

18. The system of claim 13, wherein a unidirectional virtual connection point acts as a selector for two or more inputs, and wherein the two or more inputs include one or more of two or more unidirectional virtual connection points, two or more unidirectional connection termination points, and a unidirectional virtual connection point and a unidirectional connection termination point.

19. The system of claim 18, wherein the unidirectional virtual connection point acts simultaneously as the selector for the two or more inputs and as an origination point for a multicast set of connections.

20. The system of claim 13, wherein a unidirectional virtual connection point acts as one or more of a bridge, a selector, and a bridge/selector in a protection application.

21. The system of claim 13, wherein a unidirectional virtual connection point is used to create a local or remote test access point, wherein the local or remote test access point is configured in either a monitor mode or a split mode, and wherein the monitor mode comprises a unidirectional connection to test equipment and the split mode comprises injecting test traffic.

22. The system of claim 13, wherein the use of unidirectional virtual connection points enables multicast, drop-and-continue, protection, signaled network connection, bridge-and-roll, test access point, and circuit switching applications.

23. The system of claim 22, wherein through the use of the unidirectional virtual connection points, the cross-connect model relationship is not required to be defined between two termination points.

\* \* \* \* \*